United States Patent [19]

Day

[11] Patent Number: 5,184,473

[45] Date of Patent: Feb. 9, 1993

[54] PRESSURE CONTROLLED SWITCHING VALVE FOR REFRIGERATION SYSTEM

[75] Inventor: James Day, Scotia, N.Y.

[73] Assignee: General Electric Company, Schenectady, N.Y.

[21] Appl. No.: 833,269

[22] Filed: Feb. 10, 1992

[51] Int. Cl.⁵ ............................................. F25B 5/00
[52] U.S. Cl. ...................................... 62/199; 62/217; 62/525
[58] Field of Search ............... 62/199, 117, 525, 217; 137/494

[56] References Cited

U.S. PATENT DOCUMENTS

| | | | |
|---|---|---|---|
| 2,182,318 | 12/1939 | Newill | 62/525 |
| 4,910,972 | 3/1990 | Jaster | 62/335 |
| 4,918,942 | 4/1990 | Jaster | 62/335 |
| 4,966,010 | 10/1990 | Jaster et al. | 62/179 |
| 5,056,328 | 10/1991 | Jaster et al. | 62/180 |

FOREIGN PATENT DOCUMENTS 639691 7/1950 United Kingdom .

OTHER PUBLICATIONS

Marks' Standard Handbook for Mechanical Engineers Theodor Baumeister, Editor-in-Chief, Eighth Edition–McGraw-Hill Book Company, Sep. 1979.
Article-Refrigeration and Air Conditioning, W. F. Stoecker–McGraw-Hill Book Company, (Jun. 1958) pp. 56-61.

Primary Examiner—William E. Wayner
Attorney, Agent, or Firm—William H. Pittman

[57] ABSTRACT

A refrigerant flow switching device for alternatively conveying flow of refrigerant from either a high pressure or a low pressure evaporator to a compressor of a refrigeration system and a refrigerator using such a refrigeration system. The device utilizes the pressure difference between the higher pressure refrigerant from the high pressure evaporator and the lower pressure refrigerant from the low pressure evaporator or atmospheric pressure to open and close a first flow controller of the device positioned in a conduit leading from the high pressure evaporator to the compressor. The device further comprises a second flow controller, such as a check valve positioned in a conduit leading the low pressure evaporator to the compressor, which stays open only when the first flow controller is closed. The first flow controller comprises a piston which is expanded from a first position to a second position by the pressure of refrigerant from the high pressure evaporator against a constant force provided by a compression spring, positioned against the piston. The piston attached through a torsion spring to a gate having an orifice causes the gate orifice to snap open or close when the piston expands or compresses respectively for either allowing or preventing flow of refrigerant from the high pressure evaporator to the compressor.

21 Claims, 8 Drawing Sheets

*FIG. 2B*
STATE 1

FIG. 2C
STATE 2

FIG. 2D
STATE 1

FIG. 2E
STATE 2

PRESSURE CONTROLLED SWITCHING VALVE FOR REFRIGERATION SYSTEM

CROSS REFERENCE TO RELATED APPLICATIONS

This application is related to commonly assigned copending applications Ser. No. 07/612,290, filed on Nov. 9, 1990, titled Refrigeration System and Refrigerant Flow Control Apparatus Therefore and Ser. No. 07/829,814, now U.S. Pat. No. 5,156,016.

FIELD OF THE INVENTION

The present invention generally relates to refrigeration systems, and more particularly relates to refrigeration systems with multiple evaporators having pressure controlled autonomous switching valves for conveying refrigerant from the multiple evaporators to a compressor unit of such refrigeration systems.

BACKGROUND OF THE INVENTION

In a typical refrigeration system, refrigeration circulates continuously through a closed circuit. The term "circuit" as used herein, refers to a physical apparatus whereas the term "cycle" as used herein refers to operation of a circuit, e.g., refrigerant cycles in a refrigeration circuit. The term "refrigerant", as used herein, refers to refrigerant in liquid, vapor and/or gas form. Components of the closed circuit cause the refrigerant to undergo temperature/pressure changes. The temperature/pressure changes of the refrigerant result in energy transfer. Typical components of a refrigeration system include, for example, compressors, condensers, evaporators, control valves, and connecting piping. Details with regard to some known refrigeration systems are set forth in Baumeister et al., Standard Handbook for Mechanical Engineers, McGraw Hill Book Company, Eighth Edition, 1979, beginning at page 19-6.

Energy efficiency is one of the important factors in the assessment of refrigeration systems. Particularly, an ideal refrigeration system operates at an ideal refrigeration effect. However in practice, an actual refrigeration system operates at less than the ideal refrigeration effect.

Increased energy efficiency is typically achieved by utilizing more expensive and more efficient refrigeration system components, adding extra insulation adjacent to the area to be refrigerated, or by other costly additions. Increasing the energy efficiency of a refrigeration system therefore usually results in an increase in the cost of the system. It is therefore, desirable to increase the efficiency of a refrigeration system and minimize any increase as a result thereof in the cost of the system.

In some apparatus utilizing refrigeration systems, more than one area needs to be refrigerated, and at least one area requires more refrigeration than another area. A typical household refrigerator, which includes a freezer compartment and a fresh food compartment, is one example of such an apparatus. The freezer compartment is preferably maintained between $-10°$ Fahrenheit (F) and $+15°$ F., and the fresh food compartment is preferably maintained between $+33°$ F. and $+47°$ F.

To meet these temperature requirements, a typical refrigeration system includes a compressor coupled to an evaporator disposed within the household refrigerator. The terms "coupled" and "connected" are used herein interchangeably. When two components are coupled or connected, this means that the components are linked, directly or indirectly in some manner in refrigerant flow relationship, even though another component or components may be positioned between the coupled or connected components. For example, even though other components such as a pressure sensor or an expander are connected or coupled in the link between the compressor and evaporator, the compressor and evaporator are still coupled or connected.

Referring again to the refrigeration system for a typical household refrigerator, the evaporator is maintained at about $-10°$ F. (an actual range of about $-30°$ F. to $0°$ F. is typically used) and air is blown across the coils of the evaporator. The flow of the evaporator-cooled air is controlled, for example, by barriers. A first portion of the evaporator-cooled air is directed to the freezer compartment and a second portion of the evaporator-cooled air is directed to the fresh food compartment. To cool a fresh food compartment, rather than utilizing evaporator-cooled air from an evaporator operating at about $-10°$ F., it is possible to utilize an evaporator operating at, for example, about $+25°$ F. (or a range of about $+15°$ F. to $+32°$ F.). A typical refrigeration system utilized in household refrigerators, therefore, produces its refrigeration effect by operating an evaporator at a temperature which is appropriate for the freezer compartment but lower than it needs to be for the fresh food compartment.

It is well-known that the energy required to maintain an evaporator at about $-10°$ F. is greater than the energy required to maintain an evaporator at about $+25°$ F. in a refrigerator. A typical household refrigerator therefore uses more energy to cool the fresh food compartment than is necessary, operating at reduced energy efficiency.

The above referenced household refrigerator example is provided for illustrative purposes only. Many apparatus other than household refrigerators utilize refrigeration systems which include an evaporator operating at a temperature below a temperature at which the evaporator actually needs to operate.

Refrigeration systems which operate at reduced energy consumption are described in commonly assigned U.S. Pat. Nos. 4,910,972 and 4,918,942. The patented systems utilize at least two evaporators and a plurality of compressors or a compressor having a plurality of stages. For example, in a dual, i.e., two, evaporator circuit for household refrigerators, a first evaporator operates at $+25°$ F. and a second evaporator operates at $-10°$ F. Air cooled by the first evaporator is utilized for the fresh food compartment and air cooled by the second evaporator is utilized for the freezer compartment. Utilizing the dual evaporator refrigeration system in a household refrigerator results in increased energy efficiency. Energy is conserved by operating the first evaporator at the temperature (e.g., $+25°$ F). required for the fresh food compartment rather than operating an evaporator for the fresh food compartment at $-10°$ F. Other features of the patented systems also facilitate increased energy efficiencies.

To drive the plurality of evaporators in the refrigeration systems described in U.S. Pat. Nos. 4,910,972 and 4,918,942, and as mentioned above, a plurality of compressors or a compressor including a plurality of stages are utilized. Utilizing a plurality of compressors or utilizing a compressor having a plurality of stages results in increasing the cost of the refrigeration system over the cost, at least initially, of refrigeration systems utilizing one evaporator and one single stage compressor. It is therefore desirable to provide improved energy efficiency achieved by using a plurality of evaporators and to minimize, if not eliminate, the increase in cost associated with a plurality of compressors or a compressor having a plurality of stages.

STATEMENT OF THE INVENTION

The present invention is directed to a refrigerant flow switching device for alternately conveying refrigerant from either high pressure or lower pressure evaporator means to compressor means of a refrigeration system, the device comprising, a first flow controller positioned in a refrigerant flow relationship between the high pressure evaporator means and the compressor means, and comprising expandable enclosure means responsive to pressure from the high pressure evaporator means for compelling the expandable enclosure means to move from a first position to a second position against a force provided by a first biased means, gate member means for preventing flow of refrigerant from the high pressure evaporator means to the compressor means when the expandable enclosure means is at the first position and for allowing flow of refrigerant from the high pressure evaporator means to the compressor means when the expandable enclosure means is at the second position, second biased means connected to the expandable enclosure means, and having roller means mounted thereon for snapping the gate member means alternately between the first position and the second position; and a second flow controller positioned in a refrigerant flow relationship between the low pressure evaporator means and the compressor means for allowing flow of refrigerant from the low pressure evaporator means to the compressor means only when the first flow controller prevents flow of refrigerant form the high pressure evaporator means to the compressor means.

The present invention is also directed to a refrigerator, comprising, compressor means, condenser means connected to receive refrigerant discharged from the compressor means, a fresh food compartment, first evaporator means for refrigerating the fresh food compartment and connected to receive at least part of the refrigerant discharged from the condenser means, a freezer compartment, second evaporator means for refrigerating the freezer compartment and connected to receive at least part of the refrigerant discharged from the condenser means; and the aforedescribed refrigerant flow switching device for alternately conveying refrigerant from either the high pressure or the low pressure evaporator means to the compressor means.

The present invention provides increased energy efficiency by utilizing a plurality of evaporators which operate at desired, respective, refrigeration temperatures. Further, by utilizing, in one embodiment, a single-stage compressor rather than a plurality of compressors or a compressor having a plurality of stages, increased costs associated with improved energy efficiency are minimized.

DETAILED DESCRIPTION OF THE PREFERRED EMBODIMENT

The present invention, as described herein, is believed to have its greatest utility in refrigeration systems and particularly in household refrigerator freezers. The present invention, however, has utility in other refrigeration applications such as control of multiple air conditioning units. The term refrigeration systems, as used herein, therefore not only refers to refrigerator/freezers but also to many other types of refrigeration applications.

Figure 1:
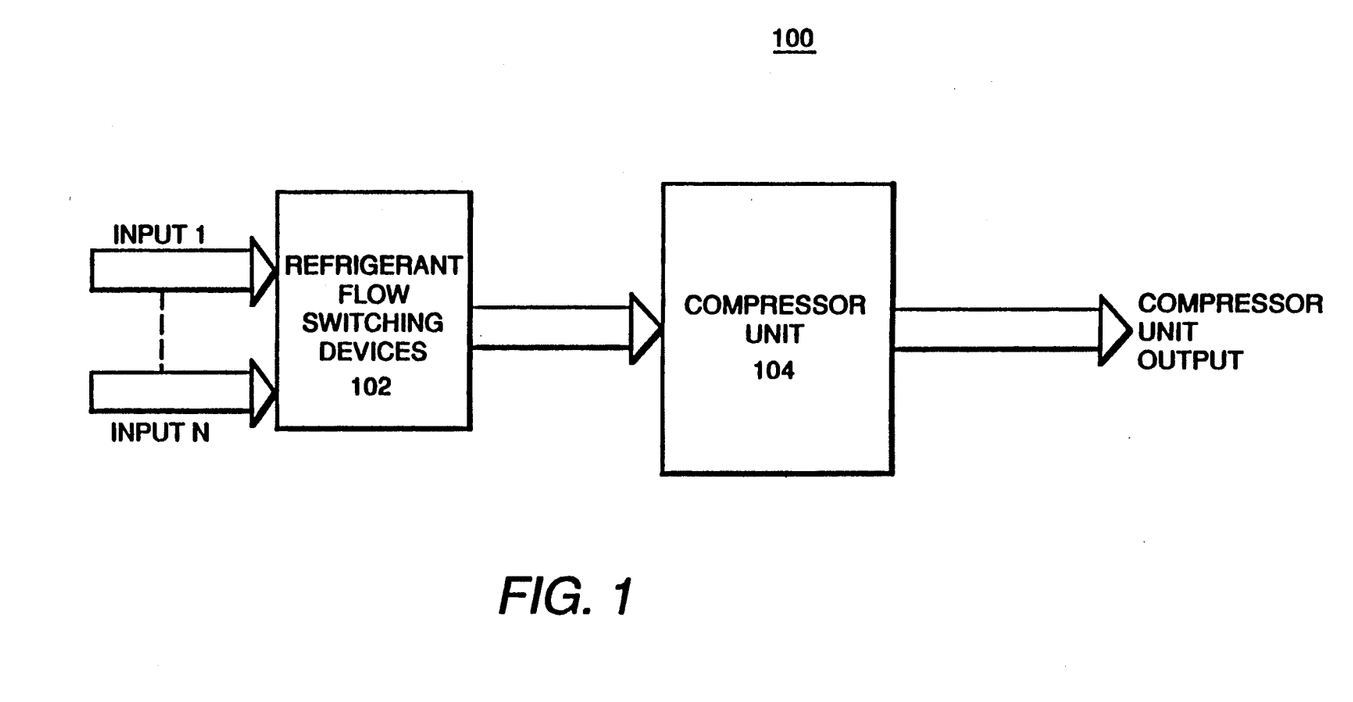
FIG. 1 is a block diagram illustrating a refrigerant flow switching device and a compressor unit.

Referring now more particularly to the drawings, FIG. 1 shows a block diagram 100 illustrating a refrigerant flow switching device or devices 102 and a compressor unit 104 in accordance with the present invention. A plurality of inputs INPUT 1-INPUT N are shown as being supplied to switching devices 102. The inputs to switching devices 102 are typically refrigerants. Refrigerant conduits, for example, are coupled to or formed integral with switching devices 102 for supplying input refrigerant. More details with regard to alternate embodiments for refrigerant flow switching devices 102 are provided hereinafter, particularly with reference to FIGS. 2B-2E, 3 and 4.

The output from switching devices 102 is supplied as input to compressor unit 104. Compressor unit 104 comprises means for compressing refrigerant, such as a single-stage compressor, a compressor having a plurality of stages, or a plurality of compressors, which provides, as output, compressed refrigerant. Embodiments of the present invention wherein a single stage compressor is utilized, are believed to have greatest utility.

Figure 2A:
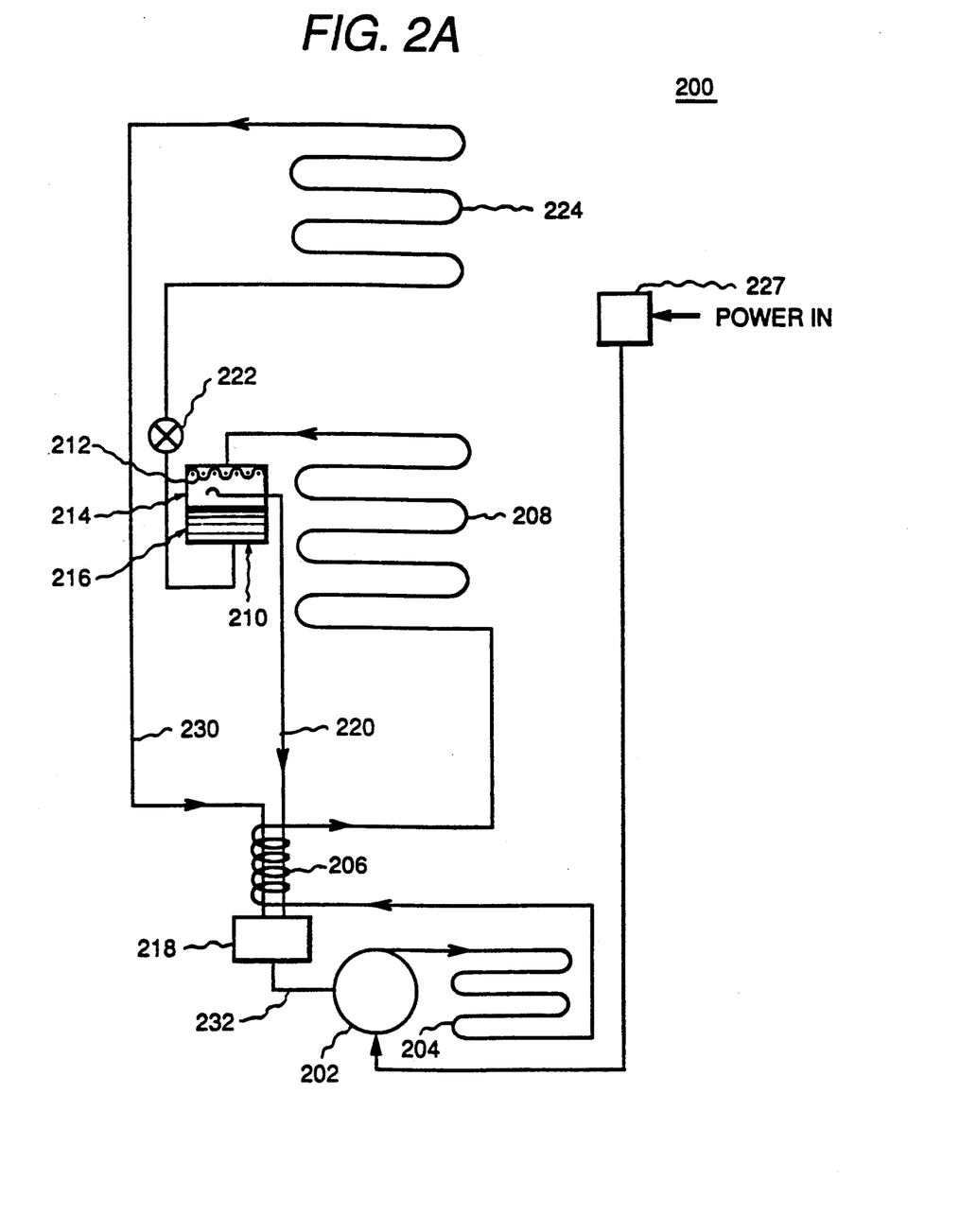
FIG. 2A illustrates a refrigeration system utilizing the refrigerant flow switching device of the preferred embodiment.

FIG. 2A illustrates a refrigeration system 200 in accordance with the preferred form of the present invention. Refrigeration system 200 includes a compressor unit 202 coupled to a condenser 204. A capillary tube 206 is coupled to the outlet of condenser 204, and a first evaporator 208, also know as a high pressure evaporator, is coupled to the outlet of capillary tube 206. The outlet of first evaporator 208, also known as a high pressure evaporator, is coupled to the inlet of a phase separator 210, which includes a screen 212 disposed adjacent to the inlet of phase separator 210, a gas- or vapor-containing portion 214 and a liquid-containing portion 216. Although sometimes referred to herein as vapor-containing portion 214 or simply as vapor portion 214, it should be understood that this portion of phase separator 210 may have gas and/or vapor disposed therein. Vapor portion 214 is coupled to supply a high pressure refrigerant, as a first input, to a refrigerant flow switching device 218. Particularly, the intake of conduit 220 is so positioned in vapor portion 214 that liquid refrigerant passing through vapor portion 214 to liquid-containing portion 216 does not enter said intake. The outlet of liquid-containing portion 216 is coupled to an expansion device 222, such as an expansion valve or a capillary tube. The expansion device 222 is sometimes referred to herein as a throttle. A second evaporator 224, also known as a low pressure evaporator, is coupled to the outlet of expansion device 222, and the outlet of second evaporator 224 is coupled to provide a low pressure refrigerant, as a second input, to refrigerant flow switching device 218.

A thermostat 227, which is preferably user adjustable, receives current flow from an external power source designated by the legend "POWER IN" and it is connected to compressor unit 202. When cooling is required, thermostat 227 provides an output signal which activates compressor unit 202. In a household refrigerator, for example, thermostat 227 is preferably disposed in the freezer compartment.

Capillary tube 206 is shown in thermal contact with conduit 220 which connects phase separator vapor portion 214 with refrigerant flow switching device 218. Capillary tube 206 is also in thermal contact with a conduit 230 which couples second evaporator 224 to refrigerant flow switching device 218. Thermal contact is achieved, for example, by soldering the exterior of capillary tube 206 and a portion of the exterior of conduits 220 and 230, together side-by-side. Capillary tube 206, in FIG. 2A, is shown as being wrapped around conduits 220 and 230 in a schematic representation of a heat transfer relationship. The heat transfer occurs in a counterflow arrangement, i.e., the refrigerant flowing in capillary tube 206 proceeds in a direction opposite to the flow of refrigerant in conduits 220 and 230. As is well known in the art, using a counterflow heat exchange arrangement, rather than a heat exchange arrangement wherein the flows proceed in a same direction, increases the heat exchange efficiency.

In operation, and by way of example, first evaporator 208 contains refrigerant at a temperature of approximately +25° F. The second evaporator 224 contains refrigerant at a temperature of approximately −10° F. Expansion device 222 is adjusted to provide barely superheated vapor flow at the outlet of second evaporator 224. A capillary tube (not shown) having an appropriate bore size and length or an expansion valve can be used as expansion device 222.

Switching device 218 controls the flow of refrigerant passing through respective evaporators 208 and 224 to compressor unit 202. When refrigeration is called for, thermostat 227 activates compressor unit 202. Vapor from second evaporator 224 enters compressor unit 202 through refrigeration flow switching device 218, when switching device 218 is configured to allow conduits 230 and 232 to be in flow communication. Alternatively, vapor from phase separator 210 enters compressor unit 202 through refrigeration flow switching device 218 when switching device 218 is configured to allow conduits 220 and 232 to be in flow communication. For ease of reference, when switching device 218 is configured to provide flow communication between conduits 230 and 232, or similarly disposed conduits, this condition is hereinafter referred to as STATE 1. When switching device 218 is configured to provide flow communication between conduits 220 and 232, or similarly disposed conduits, this condition is hereinafter referred to as STATE 2.

In the exemplified operation, and using refrigerant R-12 (dichlorodifluoromethane), refrigerant at about 20 pounds per square inch absolute (psia) is disposed in conduit 230 and refrigerant at above 40 psia is disposed in conduit 220. The inlet pressure to compressor unit 202 is about 20 psia when switching device 218 is in STATE 1 and about 40 psia when switching device 218 is in STATE 2.

At the time of transition from STATE 1 to STATE 2, flow communication between conduit 230 and conduit 232 is switched "off", to discontinue flow of refrigerant from second evaporator 224 and communication between conduit 220 and conduit 232 is switched "on" to allow refrigerant to flow from first evaporator 208. At the time of transition from STATE 2 to STATE 1, as the flow communication between conduit 220 and conduit 232 is switched off, liquid refrigerant from phase separator 210 begins flowing through second evaporator 224 but some refrigerant continues to flow through first evaporator 208, albeit at a slower rate.

More particularly, when thermostat 227 activates compressor unit 202, such as when the temperature of the freezer compartment rises above some predetermined set temperature, high pressure gas at high temperature discharged from the compressor unit 202, is condensed in condenser 204. Capillary tube 206 is preferably sized to obtain some subcooling of the liquid exiting condenser 204. Subcooling is defined as cooling of a given fluid below its saturation temperature. By subcooling a fluid below its saturation temperature, more BTUs (British Thermal Unit) can be removed by the refrigeration system. Capillary tube 206 is generally a fixed length, small bore tube. Due to the tube diameter of capillary tube 206, a high pressure drop occurs across the capillary tube length thus reducing the pressure of the refrigerant evaporates in first evaporator 208 and changes to a vapor. Capillary tube 206 meters the flow of refrigerant and maintains a pressure difference between condenser 204 and first evaporator 208.

The direct contact between the outside of capillary tube 206 into which the warm condensed liquid from condenser 204 enters and the outside of conduit 220 from phase separator 210 causes cooler conduit 220 to warm up and capillary tube 206 to cool down. Without the heating provided by capillary tube 206, the temperatures for conduits 220 and 230 in STATE 1 and STATE 2, respectively, in the preferred embodiment are about −10° F. and +25° F., respectively. Additionally, without the heating provided by capillary tube 206, moisture from air at room temperature will condense on conduits 220 and 230. Such condensed moisture tends to drip and create a flooding problem. Conduit heating by means of capillary tube 206 warms conduits 220 and 230 sufficiently to avoid condensation and it also cools the refrigerant in capillary tube 206 flowing to first evaporator 208. Even though the warming of refrigerant in conduits 220 and 230 adversely affect the system efficiency, the beneficial effect provided by the cooling of refrigerant in capillary tube 206, far outweighs such a loss of system efficiency.

The expansion of the liquid refrigerant in first evaporator 208 causes part of liquid refrigerant to evaporate. Refrigerant in liquid and vapor phases exiting from first evaporator 208 then enters phase separator 210. Liquid refrigerant accumulates in liquid-containing portion 216 and vapor accumulates in vapor portion 214 of phase separator 210. Conduit 220 supplies vapor from vapor portion 214 to switching device 218. Vapor from phase separator 210 is at generally at about +25° F.

When thermostat 227 activates compressor unit 202, and when switching device 218 is in STATE 1, liquid from liquid-containing portion 216 of phase separator 210 evaporates as it flows through throttle 222 into second evaporator 224. Thus, the temperature and pressure of refrigerant entering second evaporator 224 from throttle 222 significantly drop and any remaining liquid refrigerant evaporates in second evaporator 224, and further cools second evaporator 224 to about −10° F. As previously stated, refrigerant flows, albeit at a slow rate, through first evaporator 208 when switching device 218 is in STATE 1. A sufficient refrigerant charge is typically supplied to system 200 to maintain liquid refrigerant phase separator 210 at a desired level.

The pressure at the input of compressor unit 202 when switching device 218 is in STATE 1, is determined by the pressure at which refrigerant exists in a two-phase equilibrium at −10° F. The pressure at compressor unit 202 when switching device 218 is in STATE 2 is determined by the saturation pressure of refrigerant at +25° F.

The temperature of condenser 204 has to be greater than ambient temperature for condenser 204 to function as a condenser. The refrigerant within condenser 204, for example, may be at +105° F. The pressure of refrigerant in condenser 206, of course, depends upon the refrigerant selected.

Compressor unit 202 is any type of compressor or mechanism which provides a compressed refrigerant output. For example, compressor unit 202 is a single stage compressor, a plurality of compressors, a compressor having a plurality of stages, or any combination of compressors. Compressor unit 202 is, for example, a rotary or reciprocating type compressor. A compressor with a small volume inlet chamber is preferred since gases at two different pressures are alternately being compressed. For example, a rotary compressor with an inlet chamber volume of one cubic inch that gets compressed to 0.28 cubic inches per compressor revolution, is satisfactory. If a compressor with a large inlet chamber is used, there is a substantial delay between the time when the high pressure refrigerant stops flowing to the compressor and the time when the inlet compressor pressure is reduced sufficiently to start compressing the lower pressure refrigerant. Using a large inlet chamber also reduces the system efficiency.

FIGS. 2B, 2C and 2D and 2E illustrate, in more detail, a preferred embodiment of refrigerant flow switching device 218. Particularly, device 218 is shown as being integrally formed with conduits 220, 230 and 232. However, device 218 may be provided with inlet conduits and an outlet conduit which are coupled to conduits 220, 230 and 232, respectively by joining methods, such as welding, soldering, or mechanical coupling.

Figure 2B:
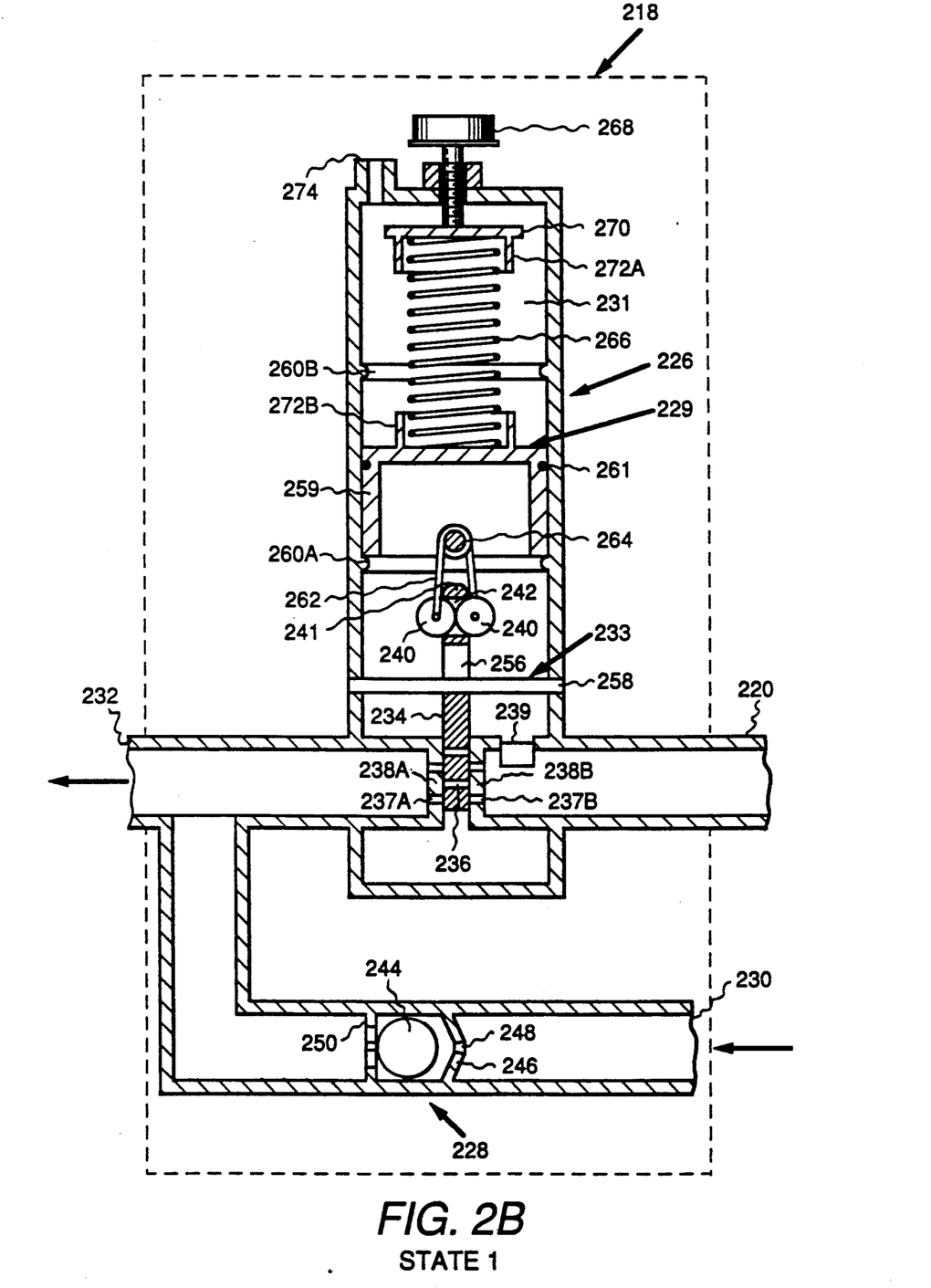
FIG. 2B shows, in more detail, the refrigerant flow switching device included in the refrigeration system of FIG. 2A at a first position (STATE 1).
Figure 2C:
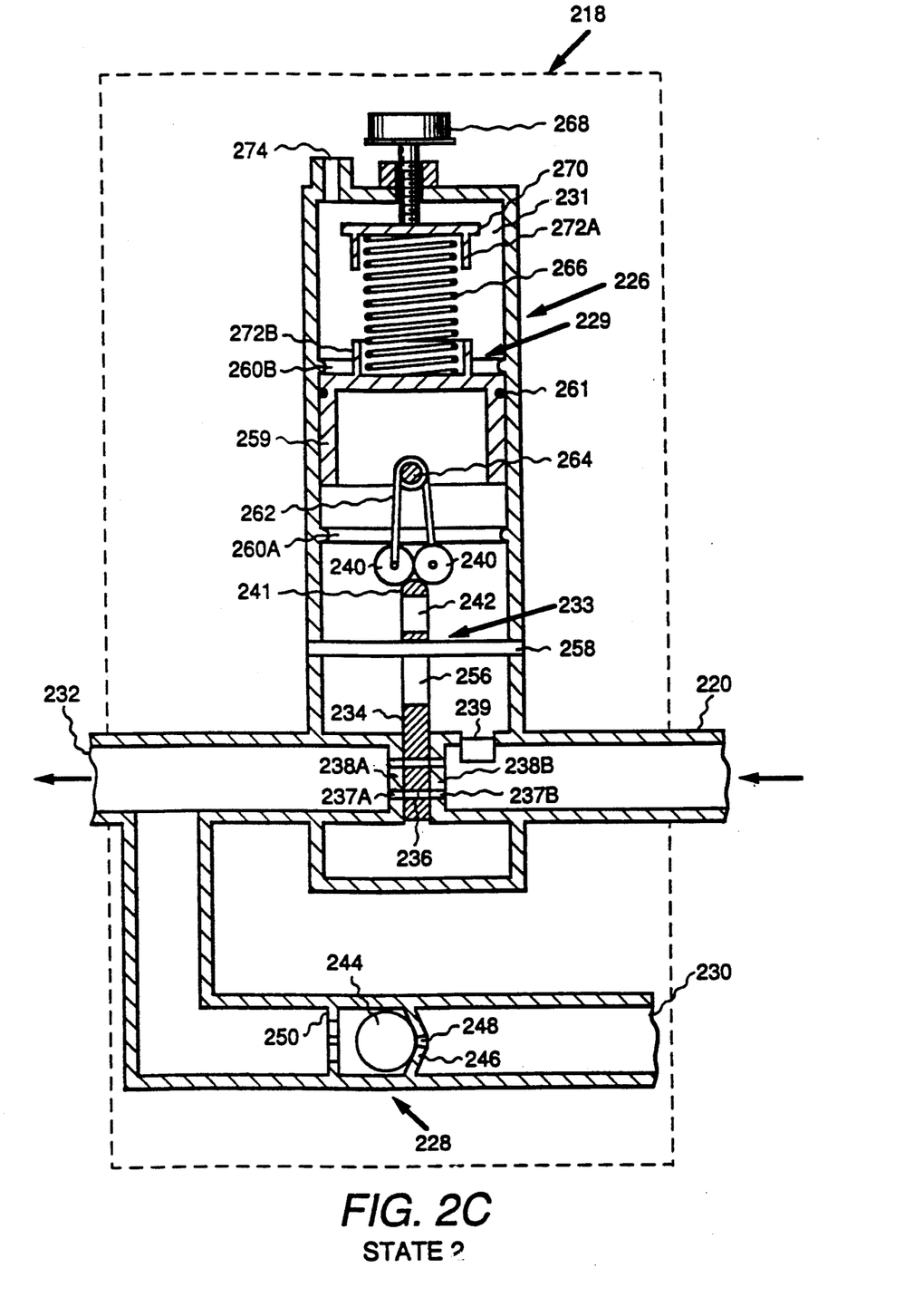
FIG. 2C shows, in more detail, the refrigerant flow switching device includes in the refrigeration system of FIG. 2A at a second position (STATE 2).

A first flow controller 226 is shown as being disposed, at least partially, within conduit 220. In FIG. 2B, first flow controller 226 is shown as being closed, so that refrigerant cannot flow from conduit 220 to conduit 232, i.e., STATE 1. In FIG. 2C, first flow controller 226 is shown as being open so that refrigerant can flow from conduit 220 to conduit 232, i.e. STATE 2. First flow controller 226 comprises a chamber 231 to which conduit 220 and 232 are attached.

First controller 226 further comprises expandable enclosure means 229, preferably a piston 259 slidably positioned within chamber 231. Piston 259 is provided with sealing means, such as a piston ring 261 to receive at least part of refrigerant from conduit 220 via a passageway 239. To one skilled in the art, it will be apparent to use some other expandable enclosure means, such as a flexible membrane or a bellows sealably attached to the bottom of chamber 231.

First controller 226 comprises second biased means, such as a torsion spring 262 connected to expandable enclosure means 229 via anchoring means, such as a piston shaft 264 that passes through the coiled portion of torsion spring 262. To one skilled in the art, it would be apparent to employ some other second means, such as a "U" shaped leaf spring having anchoring means, such as pivoting ears that hook into holes on the skirt wall of piston 259. Torsion spring 262 is preferably provided with a pair of shaft ends on which roller means, such as a roller 240, are slidably mounted. Locking means, such as lock nuts (not shown) are generally provided on each shaft end of torsion spring 262 to prevent roller 240 from slipping off the shaft end. Preferably, one roller 240 is provided on each shaft end of torsion spring 262.

First controller 226 comprises gate member means 233, which prevent flow of refrigerant from high pressure evaporator means, such as first evaporator 208 shown in FIG. 2A to compressor means, such as compressor unit 202 shown in FIG. 2A when piston 259 is at a first position shown in FIG. 2B (STATE 1), and allow flow of refrigerant from first evaporator 208, shown in FIG. 2A to compressor unit 202 when piston 259 is at a second position shown in FIG. 2C (STATE 2). The aforementioned first position corresponds to a stop 260A against which the skirt of piston 259 stops and the second position corresponds to a stop 260B against which the crown of piston 259 stops.

As shown in FIG. 2B, when first flow controller 226 is in STATE 1, piston 259 is compressed by the force provided by a first biased means, such as a compression spring 226 whose constant downward force may be adjusted by a pressure regulator knob 268 threaded into chamber 231 and connected to a pressure plate 270 placed over compression spring 266. Compression spring 266 is preferably placed within a centering well 272A on pressure plate 270 and a centering well 272B on piston 259 to centrally position it during operation of device 218. Compression spring 266 also prevents back flow of refrigerant from compressor unit 202 to first evaporator 208 when compressor unit 202 is not running. A chamber opening 274 in chamber 231 communicates with either air at atmospheric pressure or preferably the low pressure refrigerant from conduit 230 to allow air or the low pressure refrigerant to "breathe" in and out of chamber 231 as piston 259 reciprocates between the first and the second position. To one skilled in the art, it would be apparent to replace compression spring 266 with a pressure regulating fluid introduced into chamber 231 via chamber opening 274. The fluid pressure may then be adjusted by increasing or decreasing the fluid volume within chamber 231.

Figure 2D:
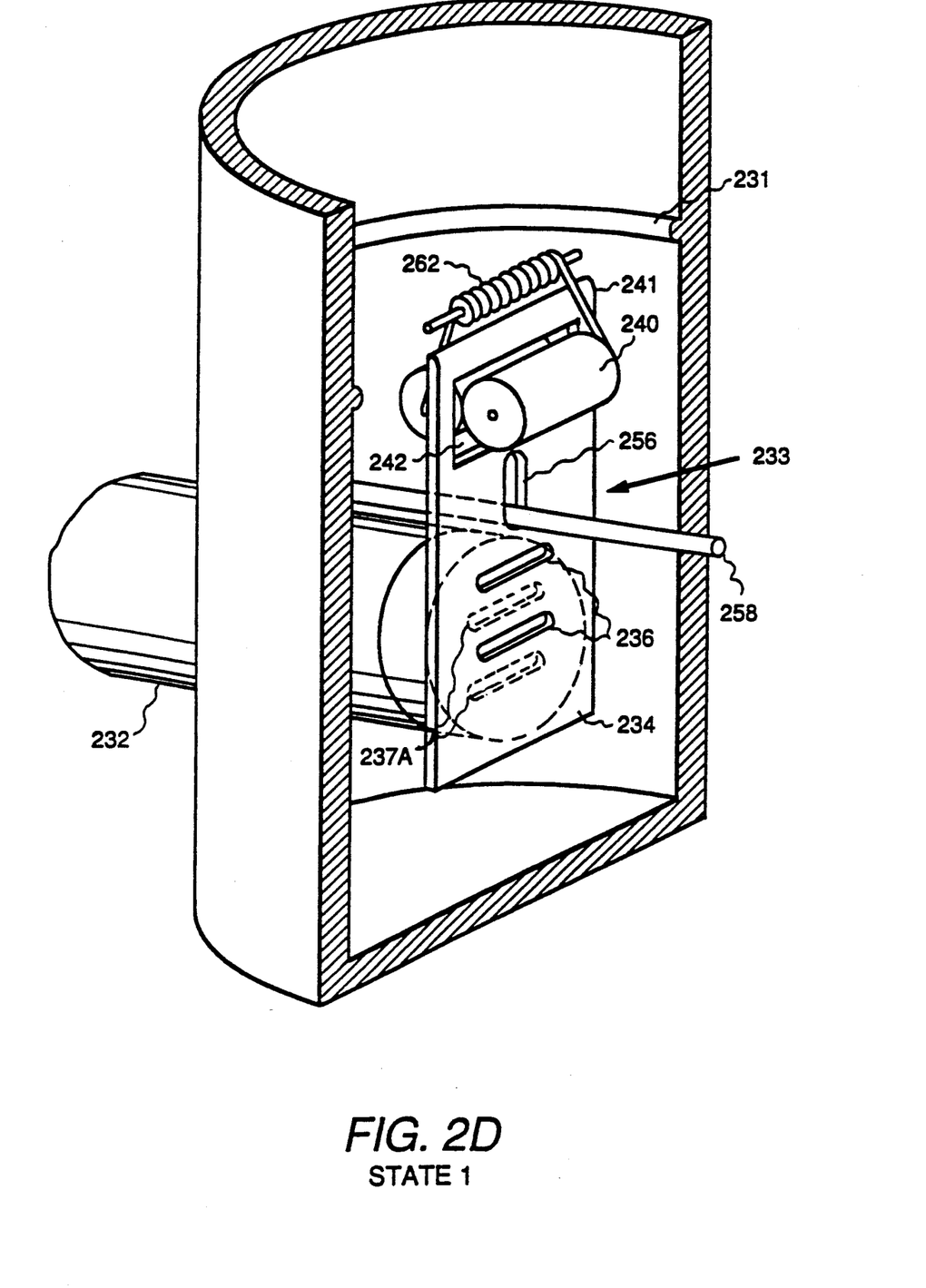
FIG. 2D is a partial 3-dimensional view of the refrigerant flow switching device of the preferred embodiment at the first position (STATE 1).
Figure 2E:
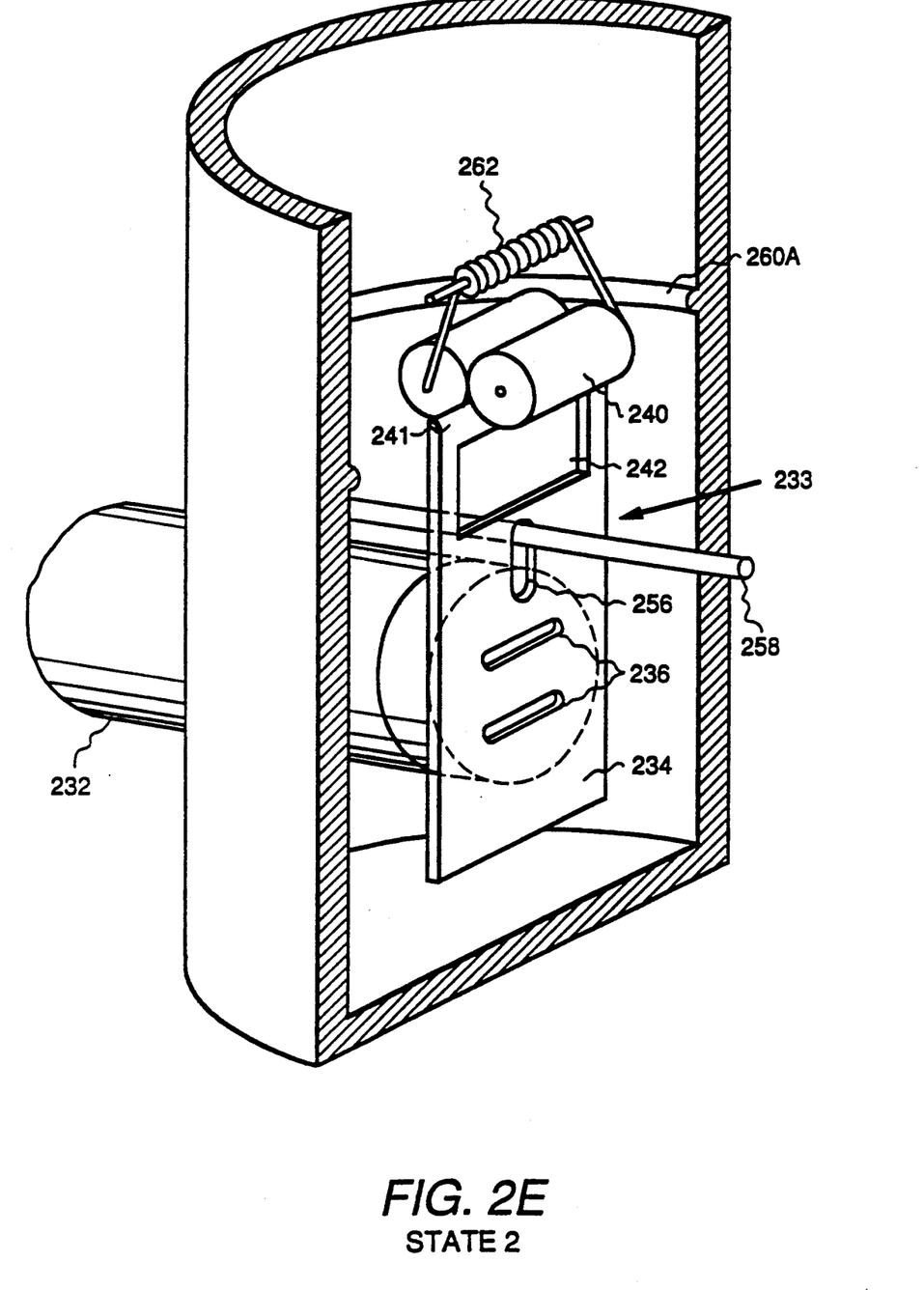
FIG. 2E is a partial 3-dimensional view of the refrigerant flow switching device of the preferred embodiment at the second position (STATE 2).

Gate member means 233 further comprise a plate member 234 having preferably a plurality of orifices 236 therein. Two substantially identical orifices having an elongated shape are most preferred. The aforementioned orifices of elongated shapes reduce the travel distance of plate member 234 while providing an opening of sufficient size on plate member 234 to permit efficient passage of refrigerant therethrough. FIGS. 2D and 2E show the details of plate member 234. Piston 259 is not shown in FIGS. 2D and 2E for greater clarity. Orifices 236 are preferably aligned to provide unrestricted passage to flow of refrigerant. Plate member 234 is positioned between two substantially parallel faces 238 A and B located in conduits 232 and 220, respectively. Each face 238 A and B is provided with a portal 237 A and B, respectively. Portals 237 A and B are preferably substantially similar in size and shape to orifices 236, such that when gate member means 233 are in an open position orifices 236 on plate member 234 align with portals 237 A and B on faces 238 A and B, thereby allowing flow of refrigerant and when gate member means 233 are in a closed position, orifices 236 do not align with portals 237 A and B, thereby preventing flow of refrigerant.

Plate member 234 is further provided with a roller slot 242 in which rollers 240 roll in and out. A leading edge 241 of plate member 234 is preferably rounded to facilitate riding of rollers 240 over plate member 234 into roller slot 242 on plate member 234. It is understood that one skilled in the art may also use leading edge 241 of some other shape, such as a wedge shape, to facilitate riding of rollers 240 on plate member 234. Movement of plate member 234 is limited by motion limiting means, such as a motion limiting slot 256 through which a motion limiting rod 258 passes. Motion limiting rod 258 is fixedly attached to the walls of chamber 231. FIG. 2B and 2D corresponding to the first position (STATE 1) show that rollers 240 are within roller slot 242 and FIG. 2C and 2E corresponding to the second position (STATE 2) show that rollers 240 are out of roller slot 242.

Plate member 234 below motion limiting slot 256 may be bifurcated into a pair of substantially parallel blades, which are preferably held against each face 238 A and B, by the force provided by a third biased means, such as a leaf spring. The substantially parallel blades held against faces 238 A and B help in preventing leakage of refrigerant.

Rather than being constructed as shown in FIGS. 2B-2C, it is contemplated that chamber 231 of first flow controller 226 may be constructed, for example, from a single block of material, such as polymer or steel. Many other techniques, such as plastic molding, could be also utilized to make chamber 231.

The location and type of flow controller used as first flow controller 226, of course, may differ from the location and type shown in FIGS. 2B-C. For example, first flow controller 226 may be located anywhere along the length of conduit 220. However, to minimize any delay between switching from one refrigerant flow to another, it is desirable to locate flow controller 226 as close as possible to conduit 232, as shown in FIGS. 2B and 2C, in order to minimize the volume between flow controller 226 and compressor unit 202.

Device 218 includes a second flow controller 228, shown as a check valve, disposed in the conduit 230. FIG. 2B shows check valve 228 as being in an open position, i.e., refrigerant can flow between conduit 230 and conduit 232. Particularly, check valve 228 may include a ball 244 and a ball seat 246 having an opening 248. A cage 250 prevents ball 244 from escaping when the pressure in conduit 230 is greater than the pressure in conduit 232. When ball 244 is forced into the seat 246 from the pressure of refrigerant in conduit 232, check valve 228 is closed and refrigerant cannot flow between conduit 230 and conduit 232. The location and type of flow controller for second flow controller 228, of course, may differ from the location and type shown in FIG. 2B. For example, second flow controller 228 may be located anywhere along the length of conduit 220. However, for minimizing any delay between switching from one refrigerant flow to another, as shown in FIG. 2B, it is desirable to locate flow controller 228 as close as possible to conduit 232, in order to minimize the volume between flow controller 228 and compressor unit 202.

In operation, and by way of example, conduit 230 has refrigerant at low pressure, e.g., about 20 psia, flowing therethrough and conduit 220 has refrigerant at a higher pressure, e.g., about 40 psia, flowing therethrough. The conduit 232 side of face 238 A is at pressure P1 where pressure P1 is equal to the pressure of refrigerant disposed in conduit 232. Pressure P1 is sometimes referred to herein as the compressor unit inlet pressure. Pressure P1 would alternate, in this example, from about 40 psia to 20 psia, depending upon which flow controller is open.

The conduit 220 side of face 238 B is at pressure P2, where pressure P2 is equal to the pressure of the high pressure refrigerant supplied by conduit 220. Pressure P2 in this example, is about 40 psia or above. When first flow controller 226 is closed (STATE 1), pressure P1 will stabilize at 20 psia, since second flow controller 228 is in open position and compression unit 202 receives flow of refrigerant from second evaporator 224 (low pressure evaporator). At the same time, pressure P2 at 40 psia building up within the space enclosed by piston 259, starts to push piston 259 from the first position, as shown in FIG. 2B, to the second position as shown in FIG. 2C. Piston 259 pushes against the constant force of compression spring 266 as it moves from the first position to the second position. The selection of particular springs, piston, and chamber size of first flow controller 226 is matched to the desired operating characteristics.

In the present examples, the initial conditions (STATE 1) as shown in FIG. 2B are as follows: second flow controller 228 is open; piston 259 is in compressed state due to the force exerted by compression spring 266; Rollers 242 on torsion spring 262 are positioned within roller slot 242 of plate member 234; orifices 236 on plate member 234 are not lined up with portals 237 A and B on faces 238 A and B, respectively, i.e. first flow controller 226 is closed and piston 259 is starting to expand against the constant force exerted by compression spring 266.

As piston 259 expands, torsion spring 262 located on piston shaft 264 of piston 259 also starts moving from the first position to the second position. As rollers 240 on torsion spring 262 start moving out of roller slot 242 and onto plate member 234, they exert an outward force on spring 262 thereby further increasing torsional stresses in it. As the forces in spring 262 increase further, a vertical force component acting along rollers 240 also increases until it overcomes the frictional force present between faces 237 A and B and plate member 234. Spring 262 rapidly relieves some of the stresses building up within it by snapping plate member 234 in a downward direction, and thereby putting orifices 236 in a fluid communication with portals 237 A and B on faces 238 A and B, respectively. As a result first controller 226 opens and high pressure refrigerant from conduit 220 flows to conduit 232 such that pressure P1 and P2 are substantially equal. FIG. 2C (STATE 2) shows the aforementioned configuration.

High pressure in conduit 232 (P2) then causes second flow controller 228 to close. Particularly, the high pressure refrigerant exerts more force against check valve 228 than the low pressure refrigerant from conduit 230. Ball 244 is therefore forced into and held against seat 246, until P1 is at a higher pressure.

Referring to FIG. 2C (STATE 2), since orifices 236 and portals 237 A and B are lined up, the pressure that had built up within the space enclosed by piston 259, falls at a rate equal to that of first evaporator 208. As a result, the force exerted by compression spring 266 exceeds the decreasing pressure provided by the high pressure refrigerant from conduit 220, and piston 259 is compressed by the force of compression spring 266, which in turn causes rollers 240 on spring 262 to roll over leading edge 234l and finally snap it into roller slot 242. As rollers 240 snap into roller slot 242, an upward force on plate member 234 snaps it from the second position (STATE 2) to the first position (STATE 1). When the high pressure refrigerant discontinues flowing through first controller 226, second controller 228 then opens to allow the low pressure refrigerant from conduit 230 to flow to compressor unit 202. At this point device 218 is once again at the initial condition (STATE 1) and the process is repeated. The initial duration of each cycle of this alternating process is about 5 to about 6 seconds and as temperatures in evaporators 208 and 224 drop, the duration of each cycle extends to about 20 to about 60 seconds.

Refrigerant flow switching device 218 utilizes, in part, the pressure difference between the high and low pressure refrigerants or the pressure difference between the high pressure refrigerant and atmospheric pressure to control refrigerant flow. Device 218 is self-contained in that no outside energy source, e.g., electric power, is required to open and close the flow controllers. The preferred embodiment illustrated in FIGS. 2B–E therefore is particularly useful as the refrigerant flow control unit when it is desired to eliminate a need for any outside energy source to control refrigerant flow.

If energy efficiency and cost are primary concerns, it is contemplated that for system 200 of FIG. 2A having refrigerant flow switching device 218 of FIGS. 2B–C, compressor unit 202 is a single stage compressor. By utilizing a plurality of evaporators selected to operate at desired respective refrigeration temperatures, improved energy use results. Further, by utilizing a single-stage compressor rather than a plurality of compressors or a compressor having a plurality of stages, increased costs associated with an improved energy efficiency are minimized.

The refrigeration system 200 illustrated in FIG. 2A requires less energy than a single-evaporator, single-compressor circuit with the same cooling capacity. Some efficiency advantages come about due to the fact that the vapor leaving the higher temperature evaporator 208 is compressed from an intermediate pressure, rather than from the lower pressure of the vapor leaving the lower temperature evaporator 224. Since the vapor from phase separator 210 is at a higher pressure than the vapor from freezer evaporator 224, the pressure ratio is lower when vapor from phase separator 210 is compressed to a desired compressor outlet pressure than when the vapor from the freezer evaporator 224 is compressed. Thus, less compression work is required than if all the refrigerant was compressed for the freezer exit pressure.

Figure 3:
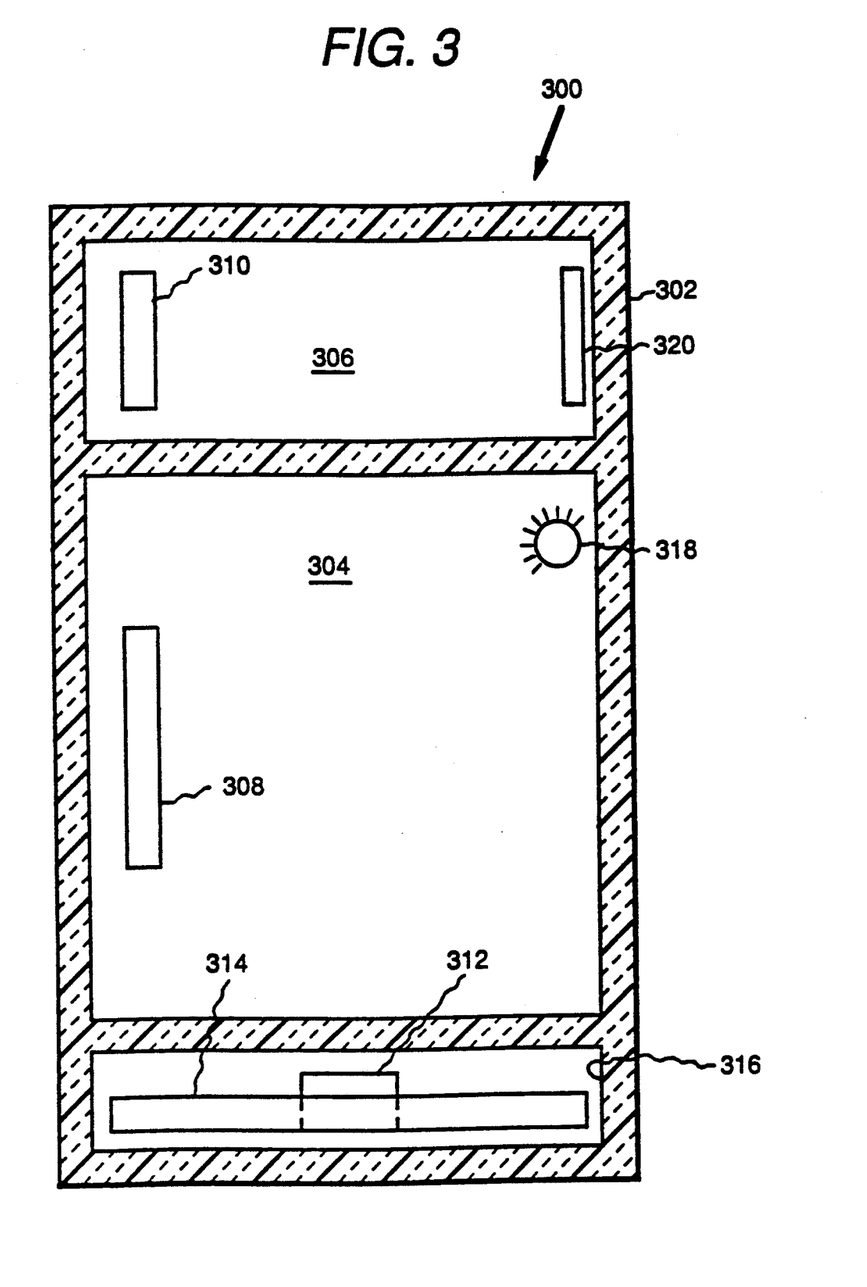
FIG. 3 is a block diagram illustration of a household refrigerator incorporating a refrigeration system having a fresh food evaporator and a freezer evaporator.

FIG. 3 is a block diagram illustration of a household refrigerator 300 including an insulated wall 302 forming a fresh food compartment 304 and a freezer compartment 306. FIG. 3 is provided for illustrative purposes only, particularly to show one apparatus which has substantially separate compartments which require refrigeration at different temperatures. In the household refrigerator, fresh food compartment 304 and freezer compartment 306 are typically maintained at about $+33°$ to $+47°$ F. and $-10°$ F. to $+15°$ F., respectively.

In accordance with the present invention, a first evaporator 308 (high pressure evaporator) is shown disposed in the fresh food compartment 304 and a second evaporator 310 (low pressure evaporator) is shown disposed in freezer compartment 306. The present invention is not limited to the physical location of the evaporators and the location of the evaporators shown in FIG. 3, is only for illustrative purposes and to facilitate ease of understanding. It is contemplated that the evaporators shown in FIG. 3, is only for illustrative purposes and to facilitate ease of understanding. It is contemplated that the evaporators 308 and 310 could be disposed anywhere in the household refrigerator, or even outside the refrigerator and the evaporator-cooled air from each respective evaporator is directed to the respective compartments via conduits, barriers, and the like.

First and second evaporators 308 and 310 are driven by a compressor unit 312 and condenser 314 shown located in a compressor/condenser compartment 316. A control knob 318 is disposed in fresh food compartment 304 and a temperature sensor 320 is disposed in freezer compartment 306. Control knob 318 adjusts via linking means, such as a flexible cable, the force provided by compression spring 266 of first flow controller 226 of refrigerant flow switching device 218 via pressure regulator 268, shown in FIGS. 2B and 2C. The temperature in compartment 304 may be controlled by the aforementioned adjustment of pressure because under a saturated condition (a two-phase refrigerant co-existing in a liquid and vapor state) typically existing in first evaporator 308 during its operation, a given pressure of the refrigerant is associated with a specific temperature of the refrigerant in first evaporator 308. Control know 318 may be calibrated to read in gradations of temperature desired in fresh food compartment 304. Temperature sensor 320 sends a signal to compressor 312 to run or to stop according to the setting on it. First evaporator 308 is typically operated at about $+15°$ F. to about $+32°$ F. and the second evaporator 310 is typically operated at about 30° F. to about 0° F. for maintaining fresh food compartment 304 at about $+33°$ F. to $+47°$ F. and freezer compartment 306 about $-10°$ F. to $+15°$ F., respectively.

In operation, and by way of example, control knob 318 of a typical household refrigerator of 19 cubic feet capacity is coupled to a refrigerant flow switching device of the present invention (not shown in FIG. 3). When control knob 318, for example is set at 38° F. in fresh food compartment 304, that setting corresponds to a refrigerant temperature of about 25° F. and pressure of about 45 psia in first evaporator 308 and first flow controller 226, shown in FIGS. 2B–C. When refrigerant pressure in the space enclosed by piston 259 exceeds 45 psia, piston 259 causes plate member 234 to switch from the closed position corresponding to STATE 1 to the open position corresponding to STATE 2 thereby conveying the high pressure refrigerant from conduit 220 to compressor unit 312. As compressor unit 312 evacuates first evaporator 308, part of the refrigerant present in evaporator 308 boils and thereby lowers the pressure and the temperature of the refrigerant present in first evaporator 308 to about 36 psia and to about 22° F., respectively. At this point, compression spring 266 overcomes the force of the high pressure refrigerant in the space enclosed by piston 259 and causes piston 259 to move from the second position to the first position, thereby shutting off the flow of high pressure refrigerant to compressor unit 312. During a typical cycle of about 21 seconds, under the aforedescribed exemplary refrigerator conditions, the high pressure refrigerant from evaporator 308 is transported to compressor unit 312 by device 218 for about 5 seconds and the low pressure refrigerant form evaporator 310 is transported to compressor unit 312 by device 218 for about 16 seconds. It is understood that the allocation of conveying time between the high pressure and the low pressure refrigerant to compressor unit 312 is a function of the cooling capacity of first evaporator 308 and second evaporator 310. The capacity ratio between first evaporator 308 and second evaporator 310 for the aforedescribed refrigerator is about 3:1. A capacity ratio is defined as a ratio of the heat removing capacity in BTUs per hour of first evaporator 308 divided by that of second evaporator 310, i.e. in the aforementioned example first evaporator 308 removes heat at about three times the rate of second evaporator 310 from their respective compartments. Cycling of device 218 continues until the temperature set on thermostat 320 in freezer compartment 306 is reached, at that time, compressor unit 312 shuts down, until further demand signal from thermostat 320 is received.

Control knob 318 and sensor 320 are preferably user adjustable so that a system user selects a temperature, or temperature range, at which each respective evaporator is to be activated and/or inactivated. In this manner, operation of a refrigerant flow switching device is adjusted by the user.

As shown in FIG. 3, the illustrative refrigeration system includes two evaporators which are selected to operate at desired, respective, refrigeration temperatures. Reduced energy use is provided by utilizing a plurality of evaporators. Further, by utilizing, in one embodiment, a single-stage compressor as compressor unit 312 rather than a plurality of compressors or a compressor having a plurality of stages, increased costs associated with the improved energy efficiency are minimized.

Figure 4:
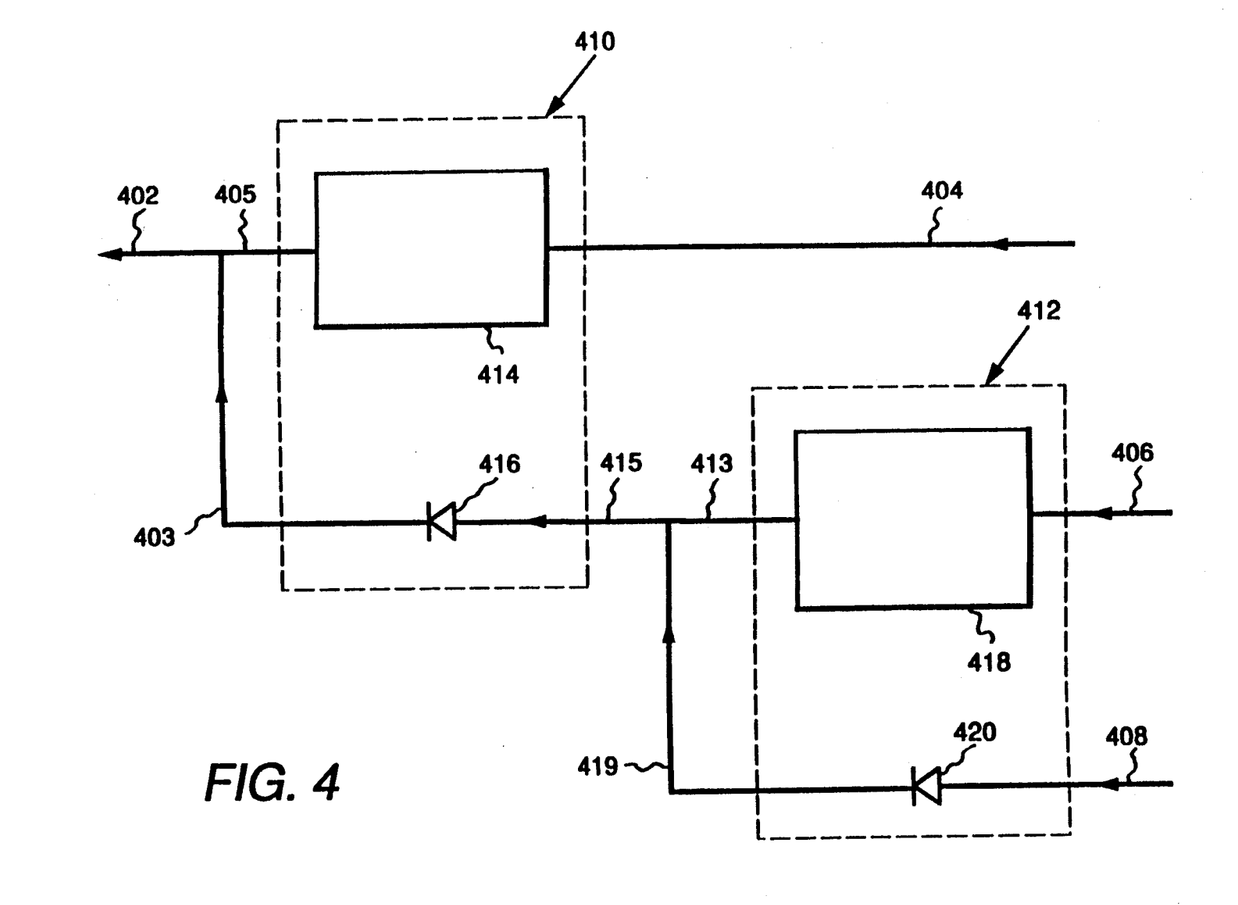
FIG. 4 is a block diagram illustration of a refrigeration system with multiple evaporators, incorporating the refrigerant flow switching device of the preferred embodiment.

FIG. 4 represents an illustrative refrigeration circuit having more than two evaporators in the system.

A conduit 404 conveys a high pressure refrigerant from a high pressure evaporator (not shown) into a first flow controller 414 of a first refrigerant flow switching device 410 of the present invention. An exemplary high pressure is about 60 psia.

A conduit 406 conveys a medium pressure refrigerant from a medium pressure evaporator (not shown) into a first flow controller 418 of the second refrigerant flow switching device 412 of the present invention. An exemplary medium pressure is about 40 psia.

A conduit 408 conveys a low pressure refrigerant into a check valve 420 of second switching device 412. An exemplary low pressure is about 20 psia. An output conduit 415 conveys either the low pressure refrigerant from conduit 419 or the medium pressure refrigerant from conduit 413 to check valve 416 of first flow switching device 410. An output conduit 402 conveys either the high pressure refrigerant from conduit 405 or an output from output conduit 403 to compression unit (not shown) of the refrigeration system.

In operation, since the temperature within a refrigeration system is progressively reduced during the initial phase, first flow switching device 410 is active and second flow switching device 412 is dormant because the high pressure is output conduit 403 prevents check valves 416 and 420 to open until the temperature and the pressure in the high pressure evaporator decreases sufficiently to allow check valve 416 to open. Thus during the initial stage, switching device 410 switches refrigerant flow between the high pressure refrigerant and the medium pressure refrigerant. As the temperature drops, the refrigerant flow pressure also drops. As a result, first switching device 410 becomes progressively less active and second switching device 412 becomes more active, i.e., refrigerant flow to conduit 402 is then alternated between the medium pressure refrigerant via conduit 415 and the low pressure refrigerant via conduit 419.

It is contemplated that in some refrigeration systems, all of the energy efficiencies and reduced costs provided by the present invention may not be strictly necessary. Thus, the invention as described herein may be modified or altered to vary efficiency and/or increased costs relative to the described embodiments. For example, a plurality of compressors or a compressor having a plurality of stages or any combination thereof, along with the refrigerant flow control means, may be utilized. Such modifications are possible, contemplated, and within the scope of the appended claims.

What is claimed is:

1. A refrigerant flow switching device for alternately conveying refrigerant from either high pressure or low pressure evaporator means to compressor means of a refrigeration system, said device comprising:

a first flow controller positioned in a refrigerant flow relationship between said high pressure evaporator means and said compressor means, and comprising expandable enclosure means responsive to pressure from said high pressure evaporator means for compelling said expandable enclosure means to move from a first position to a second position against a force provided by a first biased means, gate member means for preventing flow of refrigerant from said high pressure evaporator means to said compressor means when said expandable enclosure means is at said first position and for allowing flow of refrigerant from said high pressure evaporator means to said compressor means when said expandable enclosure means is at said second position, second biased means connected to said expandable enclosure means, and having roller means mounted thereon for snapping said gate member means alternately between said first position and said second position; and a second flow controller positioned in a refrigerant flow relationship between said low pressure evaporator means and said compressor means for allowing flow of refrigerant from said low pressure evaporator means to said compressor means only when said first flow controller prevents flow of refrigerant from said high pressure evaporator means to said compressor means.

2. The refrigerant flow switching device according to claim 1 wherein said expandable enclosure means comprises piston means slidably positioned in a chamber of said first flow controller to receive at least part of refrigerant from said high pressure evaporator means.

3. The refrigerant flow switching device according to claim 1 wherein said gate member means are positioned in a conduit connecting said high pressure evaporator means and said compressor means.

4. The refrigerant flow switching device according to claim 1 wherein said gate member means comprise:
   a plate member having an orifice therein;
   a roller slot in which said roller means move in and out as said gate member means alternate between an open position and a closed position; and
   means for limiting motion of said plate member between stops that correspond to said open position and to said closed position.

5. The refrigerant flow switching device according to claim 4, in which said plate member is positioned between two substantially parallel faces, each of said face having a portal substantially identical to said orifice on said plate member such that when said gate member means are in said open position, said orifice on said plate member and said portals on said faces are aligned, and when said gate member means are in said closed position, said orifices on said plate member and said portals on said faces are not aligned.

6. The refrigerant flow switching device according to claim 5, wherein said orifice on said plate member and said portals on said faces are provided with an elongated shape for reducing the movement of said plate member between said open and said closed position.

7. The refrigerant flow switching device according to claim 1 wherein said second biased means comprises a torsion spring having a pair of shaft ends on which said roller means are slidably mounted.

8. The refrigerant flow switching device according to claim 7 wherein said torsion spring is mounted on anchoring means positioned on said expandable enclosure means.

9. The refrigerant flow switching device according to claim 1 wherein said second flow controller comprises a check valve.

10. The refrigerant flow switching device according to claim 1 wherein force provided by said first biased means is user adjustable.

11. The refrigerant flow switching device according to claim 1 wherein said first biased means is a compression spring.

12. The refrigerant flow switching device according to claim 1 wherein said first biased means prevents back flow of refrigerant from said compressor means when said compressor means is not running.

13. The refrigerant flow switching device for alternately conveying refrigerant from either high pressure or low pressure evaporator means to compressor means of a refrigeration system, said device comprising:
   a first flow controller positioned in a refrigerant flow relationship between said high pressure evaporator means and said compressor means, and piston means responsive to pressure from said high pressure evaporator means for compelling said piston means to move from a first position to a second position against a force provided by a compression spring,
   gate member means for preventing flow of refrigerant from said high pressure evaporator means to said compressor means when said piston means is at said first position and for allowing flow of refrigerant from said high pressure evaporator means to said compressor means when said expandable enclosure means is at said second position;
   a torsion spring connected to said piston means, and having roller means mounted thereon for snapping said gate member means alternately between said first position and said second position; and
   a check valve positioned in a refrigerant flow relationship between said low pressure evaporator means and said compressor means for allowing flow of refrigerant from said low pressure evaporator means to said compressor means only when said first flow controller prevents flow of refrigerant from said high pressure evaporator means to said compressor means.

14. The refrigerant flow switching device according to claim 13 wherein said gate member means comprise:
   a plate member having an orifice therein;
   a roller slot in which said roller means move in and out as said gate member means alternate between an open position and a closed position; and
   means for limiting motion of said plate member between stops that correspond to said open position and to said closed position.

15. The refrigerant flow switching device according to claim 14, in which said plate member is positioned between two substantially parallel faces, each of said face having a portal substantially identical to said orifice on aid plate such that when said gate member means are in said open position, said orifice on said plate member and said portals on said faces are aligned, and when said gate member means are in said closed position, said orifices on said plate member and said portals on said faces are not aligned.

16. The refrigerant flow switching device according to claim 14, in which said plate member further comprises a pair of substantially planar parallel blades, each of said blades having said orifice therein.

17. A refrigerator comprising: compressor means;
   condenser means connected to receive refrigerant discharged from said compressor means;
   a fresh food compartment;
   first evaporator means for refrigerating said fresh food compartment and connected to receive at least part of the refrigerant discharged from said condenser means; a freezer compartment;
   second evaporator means for refrigerating said freezer compartment and connected to receive at least part of the refrigerant discharged from said condenser means; and
   a refrigerant flow switching device for alternately conveying refrigerant from either said high pressure or said low pressure evaporator means to said compressor means, said device further comprising,
   a first flow controller positioned in a refrigerant flow relationship between said high pressure evaporator means and said compressor means, and comprising expandable enclosure means responsive to pressure from said high pressure evaporator means for compelling said expandable enclosure means to move from a first position to a second position against a force provided by a first biased means,
   gate member means for preventing flow of refrigerant from said high pressure evaporator means to said compressor means when said expandable enclosure means is at said first position and for allowing flow of refrigerant from said high pressure evaporator means to said compressor means when said expandable enclosure means is at said second position;

second biased means connected to said expandable enclosure means, and having roller means mounted thereon for snapping said gate member alternately between said first position and said second position, and a second flow controller positioned in a refrigerant flow relationship between said low pressure evaporator means and said compressor means for allowing flow of refrigerant from said low pressure evaporator means to said compressor means only when said first flow controller prevents flow of refrigerant from said high pressure evaporator means to said compressor means.

18. The refrigerator in accordance with claim 17 wherein said fresh food compartment is maintained at a temperature warmer than said freezer compartment.

19. The refrigerator in accordance with claim 17 wherein operation of said first flow controller is user adjustable.

20. The refrigerator in accordance with claim 17 wherein said first evaporator means is effective to maintain said fresh food compartment from about $+33°$ F. to about $+47°$ F. and wherein said second evaporator means is effective to maintain said freezer compartment from about $-10°$ F. to about $+15°$ F.

21. The refrigerator in accordance with claim 17 wherein said first evaporator means is operated from about $+15°$ F. to about $+32°$ F. and said second evaporator is operated from about $-30°$ F. to about $0°$ F.

* * * * *